United States Patent
Beaujot et al.

(10) Patent No.: US 7,685,951 B2
(45) Date of Patent: Mar. 30, 2010

(54) APPARATUS FOR CONTROLLING THE PLACEMENT OF SEEDS WITHIN A FURROW

(75) Inventors: Patrick M. Beaujot, Langbank (CA); Bruce W. Wilton, Langbank (CA); David R. Duke, Langbank (CA); Brian F. Dean, Langbank (CA); Barry K. Melanson, Kennedy (CA); Dave Hundeby, Saskatoon (CA)

(73) Assignee: One Pass Implements, Inc., Langbank, Saskatchewan (CA)

( * ) Notice: Subject to any disclaimer, the term of this patent is extended or adjusted under 35 U.S.C. 154(b) by 188 days.

(21) Appl. No.: 11/544,539

(22) Filed: Oct. 5, 2006

(65) Prior Publication Data

US 2008/0083358 A1    Apr. 10, 2008

(51) Int. Cl.
  *A01C 5/00*    (2006.01)
  *A01C 7/00*    (2006.01)
  *A01C 13/00*   (2006.01)

(52) U.S. Cl. ................ 111/153; 111/154; 111/187; 111/189

(58) Field of Classification Search .......... 111/118–129, 111/149, 152–156, 170, 186–198
See application file for complete search history.

(56) References Cited

U.S. PATENT DOCUMENTS

| | | |
|---|---|---|
| 2,842,078 A | 7/1958 | Immersoete |
| 2,920,587 A | 1/1960 | Shriver |
| 4,116,140 A | 9/1978 | Anderson et al. |
| 4,272,004 A * | 6/1981 | Nilsen ................ 228/17.5 |
| 4,417,530 A | 11/1983 | Kopecky |
| 4,831,945 A | 5/1989 | Neumeyer |

(Continued)

FOREIGN PATENT DOCUMENTS

CA        2083924        5/1994

(Continued)

OTHER PUBLICATIONS

International Search Report from corresponding International Application No. PCT/CA2007/001346, mailed on Nov. 26, 2007.

(Continued)

*Primary Examiner*—Christopher J. Novosad
(74) *Attorney, Agent, or Firm*—Kolisch Hartwell, P.C.

(57) ABSTRACT

Apparatus for controlling the placement of seeds deposited by a seed placement device in a furrow. The apparatus comprise a guide member connected to the seed placement device adjacent an exit of the seeds from the placement device adapted to urge seeds discharged from the exit toward a sidewall of the furrow. The guide member of the present invention acts to stop seeds from bouncing off the sidewalls of the furrow and into the centre of the furrow. The guide member organizes the seeds to create one or more seed rows where the seeds are optimally positioned and prevents seeds from ending up in the middle of the furrow. If a fertilizer row is present below the seed furrow, this prevents damage to the seeds by preventing them from being too close to the fertilizer. The guide member also stops the seeds from being swept back into the central region of the furrow with the loose soil that flows back into this area after the knife implement has passed.

16 Claims, 3 Drawing Sheets

U.S. PATENT DOCUMENTS

| | | |
|---|---|---|
| 5,331,907 A | 7/1994 | Beaujot |
| 5,396,851 A | 3/1995 | Beaujot |
| 6,032,593 A | 3/2000 | Wendling et al. |
| 6,142,085 A | 11/2000 | Drever et al. |
| 6,955,131 B2 | 10/2005 | Beaujot et al. |
| 2002/0189513 A1 | 12/2002 | Beaujot |

FOREIGN PATENT DOCUMENTS

| | | |
|---|---|---|
| CA | 2069081 | 1/1996 |
| CA | 1239835 | 8/1998 |
| CA | 2286882 A1 | 4/2000 |
| CA | 2265367 A1 | 9/2000 |

OTHER PUBLICATIONS

What should we require of a combination seedling-drill, *Soil and Forest No. 10*, Reijo Heinonen, 1963, pp. 1-4.

Juko Brochure: Juko gives a higher yield: Trailed combine placement drills, 1978, pp. 1-5.

\* cited by examiner

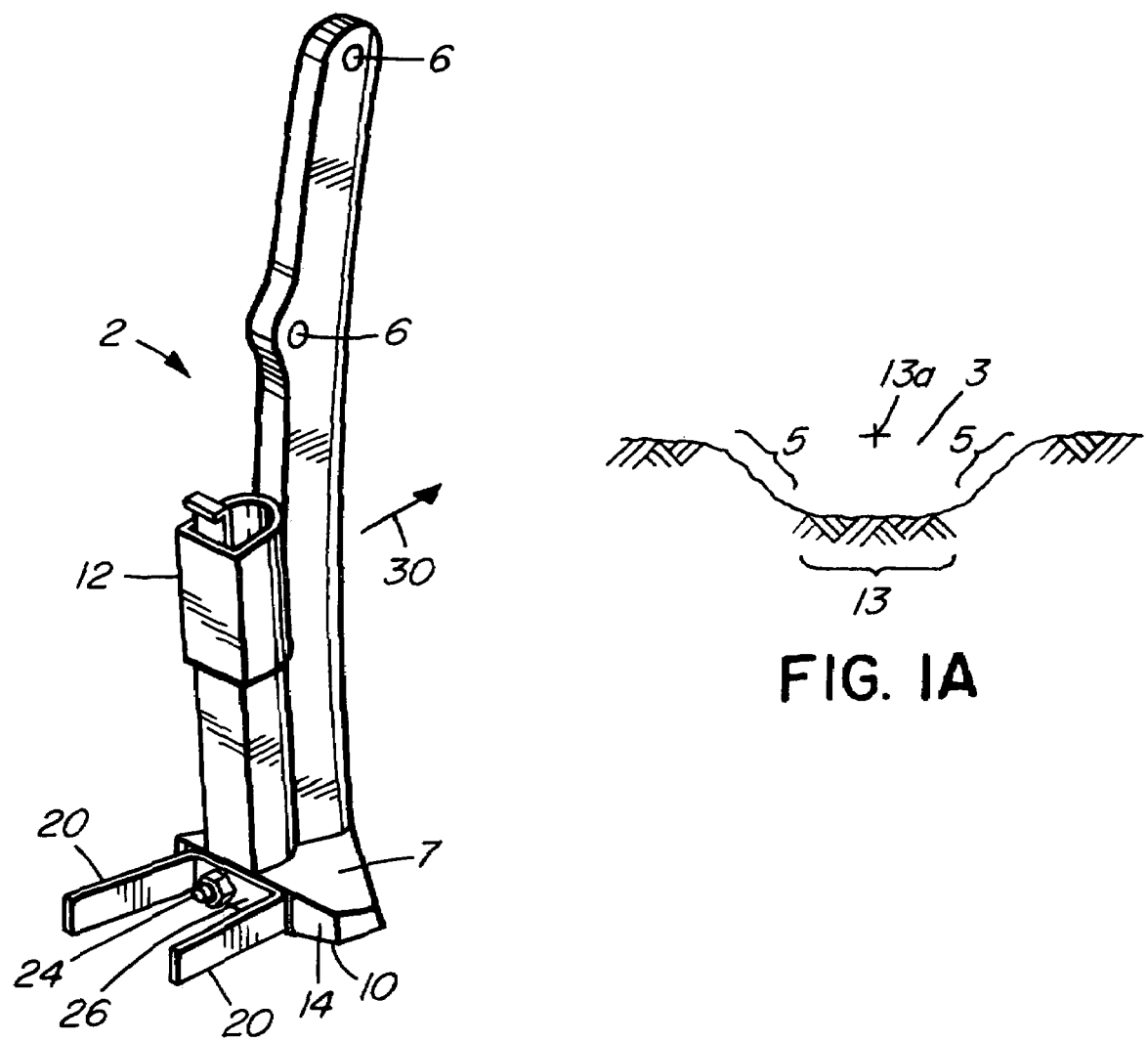
FIG. 1
FIG. 1A
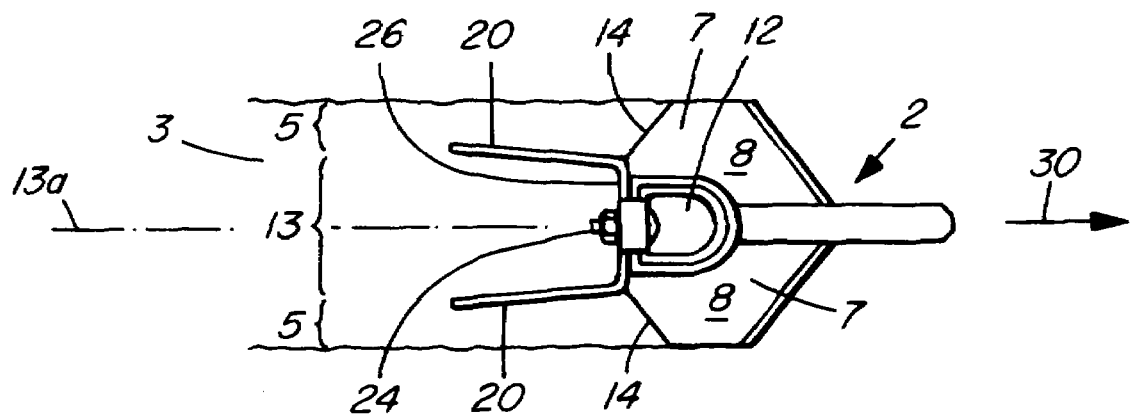
FIG. 2

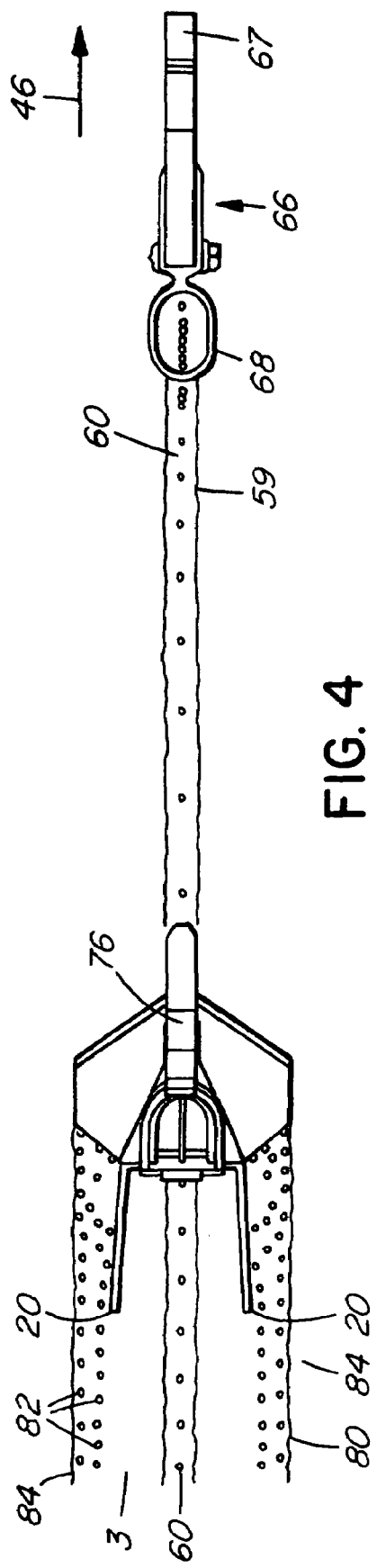
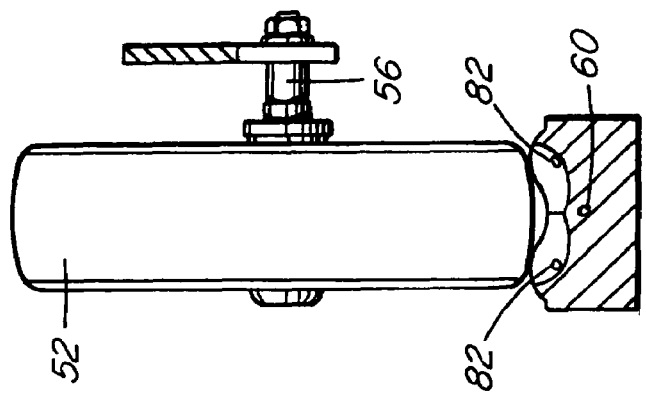
FIG. 4
FIG. 5

APPARATUS FOR CONTROLLING THE PLACEMENT OF SEEDS WITHIN A FURROW

FIELD OF THE INVENTION

This invention relates to planting equipment in general, and, more particularly, to apparatus for controlling the placement of seeds within a furrow.

BACKGROUND OF THE INVENTION

Planting equipment for delivering seeds into the ground are well known. Generally, the equipment comprises a knife arrangement for creating a trench or furrow into which seeds from a seed source are dropped. The seeds are delivered from the seed source by gravity or pneumatically, and are deposited into the furrow from an opening adjacent the knife arrangement. A packing implement follows behind and closes and compacts the soil over the seeds.

It is common that planting equipment for delivering seeds is used in conjunction with equipment for distributing fertilizer into the soil in proximity to the seeds.

An example of this type of planting equipment is a paired row opener that creates a seed furrow having a central trough with a pair of sloped sidewalls above a row of buried fertilizer. Seeds are delivered from the seed source to the spaced, sidewalls of the seed furrow to create a pair of spaced seed rows above the fertilizer.

Another example of dual material planting equipment for efficiently delivering both fertilizer and seed into furrows in the ground is disclosed in U.S. Pat. Nos. 5,331,907 and 5,396,851 both to Norbert Beaujot. These patents are directed to a planting equipment that employs a side-band opener arrangement The patents describe the general planting process of opening a first furrow in the ground into which fertilizer is deposited and opening a second furrow laterally and vertically spaced from the first into which seed is deposited. Generally, the placement of fertilizer and seed is accomplished by separate material dispensing implements such as knives or discs that are towed across a field by a tractor or suitable vehicle equipped with a supply of fertilizer and seed.

Commonly owned U.S. Pat. No. 6,955,131 issued Oct. 18, 2005 discloses a dual material planting assembly that maintains a constant relative vertical separation between the fertilizer and seed dispensing implements regardless of the depth to which the assembly is set to plant.

Agronomic research indicates that the two furrows should preferably have a lateral separation of approximately 38 mm (1.5 inches) and a vertical spacing of approximately 19 mm (0.75 inches) for optimal germination and growing conditions. Therefore, the material dispensing implements of the planting equipment need to be vertically and horizontally spaced, correspondingly.

Once the fertilizer and seed have been deposited, a packer wheel compresses the soil that has flowed back into the furrows to bury the fertilizer and seed bringing the soil into contact with the seed, which is essential for germination, and sealing the soil surface over the furrows. The depth of the seed and fertilizer placement is measured from the compacted surface left by the packer wheel.

In order to obtain the best placement of the seeds, it is desirable to better control the movement of the seeds into the furrow. Current equipment tends to deliver the seeds at high speed into the furrow with the result that the seeds tend to bounce and tumble within the furrow. A portion of the seeds may land toward the bottom of the furrow in close, undesirable proximity to the fertilizer or at a different planting depth than was intended.

SUMMARY OF THE INVENTION

To address the foregoing problem, we have developed apparatus that provides improved control over the placement of seeds in the furrow.

Accordingly, the present invention provides apparatus for controlling the placement of seeds deposited by a seed placement device in a furrow, comprising:

a guide member connected to the seed placement device adjacent an exit of the seeds from the placement device adapted to urge seeds discharged from the exit toward a pre-determined region of the furrow.

Generally, the pre-determined region will be a side wall of the furrow.

The present invention also provides in a planting device for delivering at least one seed row into a furrow having a furrow bottom and furrow side walls, the improvement comprising:

at least one guide member associated with each at least one seed row to direct seeds of the seed row toward one of the furrow side walls.

The present invention also provides in a planting device for delivering fertilizer to a first depth in the ground and delivering at least one seed row to a second depth within a seed furrow above the fertilizer, the improvement comprising:

at least one guide member associated with each at least one seed row to direct seeds of the seed row toward a wall of the seed furrow and away from the fertilizer.

The guide member of the present invention acts to stop seeds from bouncing off the sidewalls of the furrow and into the centre of the furrow. The guide member organizes the seeds to create one or more seed rows where the seeds are optimally positioned and prevents seeds from ending up in the middle of the furrow. If a fertilizer row is present below the seed furrow, confining the seed rows to the sidewalls of the furrow prevents damage to the seeds by preventing them from being too close to the fertilizer. The guide member also stops the seeds from being swept back into the central region of the furrow with the loose soil that flows back into this area after the knife implement has passed.

BRIEF DESCRIPTION OF THE DRAWINGS

Aspects of the present invention are illustrated, merely by way of example, in the accompanying drawings in which:

FIG. 1 is a perspective view of a preferred embodiment of the invention incorporated into a seed planting device;

FIG. 1A is a section view through a furrow created by the seed planting device of FIG. 1 into which seeds are distributed;

FIG. 2 is a top plan view of the planting device of FIG. 1 showing a pair of guide members extending rearwardly from the seed planting device;

FIG. 4 is a schematic view showing the manner in which the seed and fertilizer rows are laid down by the dual material planting apparatus of FIG. 3; and FIG. 5 is a detail cross-section taken along line 5-5 of FIG. 4 showing the positioning of the seed rows and fertilizer row within the ground.

DESCRIPTION OF THE PREFERRED EMBODIMENTS

Figure 2A:
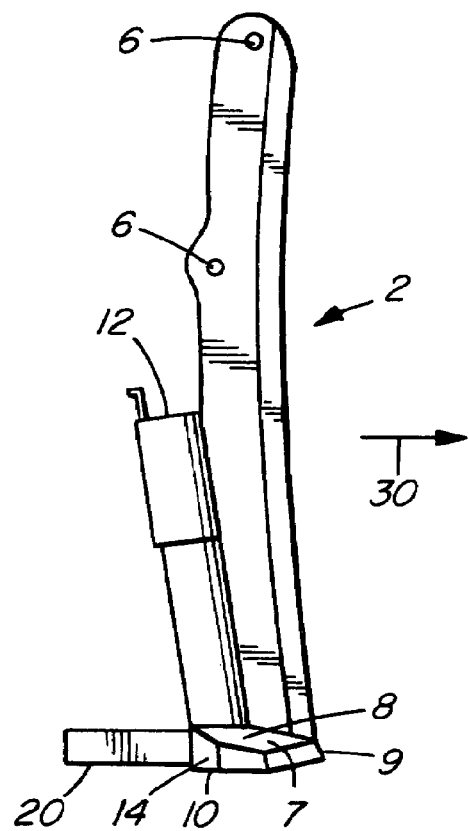
FIG. 2A is a side elevation view of the seed planting device of FIG. 1.

Referring to FIGS. 1 to 2a, there is shown a conventional planting device 2 for delivering a plurality of seeds into a furrow 3 (FIGS. 1A and 2) created by pulling the planting device through an area to be planted. Planting device 2 is equipped with guide members 20 according to the present invention to direct the seeds into a seed row that is positioned at a desired location within the furrow. Generally, this will be at a location adjacent a sidewall 5 of the furrow 3. Sidewalls 5 run parallel to a central longitudinal axis 13a of the furrow 3.

Planting device 2 comprises a seed delivery portion in the form of a generally vertical, elongate main body 4 adapted to be mounted to a framework (not shown) at mounting points 6. At the base of main body 4, there is a knife element 7 for forming furrow 3 by pulling the planting device through the ground in the direction indicated by arrow 30. In the illustrated embodiment, as best shown in the plan view of FIG. 2, the seed delivery portion is a paired row opener formed with a pair of knife elements 7, however, the seed deliver portion can also be configured with a single knife element.

Each knife element 7 of planting device 2 comprises an angled furrowing surface 8 having a leading cutting edge 9 and a trailing edge 10. Seeds to be delivered into the furrow travel from a seed source (not shown) to seed inlet 12 of the planting device. A seed passage in the main body 4 delivers the seeds to the interior of knife element 7 to emerge at seed delivery opening 14 formed in trailing edge 10. In the illustrated example, there are two knife elements 7 each having an opening 14 so that seeds are deposited in two seeds rows with each row being in the general vicinity of the sidewall 5 of the furrow 3. In general, seeds are delivered from the seed source to the furrow by gravity or pneumatic feed. When the seeds are deposited in the furrow, there is a tendency for the seeds to bounce and tumble with the result that some seeds may end up in the deeper central region 13 of the furrow (FIGS. 1A and 2) where growing conditions may be less than optimal.

To reduce the amount of seed misdirected to the central region of the furrow, planting device 2 is fitted with at least one guide member 20 to direct seeds in the row toward the furrow sidewalls. In the current embodiment, there are two seed openings 14, and two guide members 20; one guide member to control the placement of each seed row.

Each guide member 20 comprises a generally rectangular surface that extends rearwardly from a rear edge 10 of the furrowing surface adjacent an associated seed delivery opening 14. Each guide member 20 extends generally parallel to the walls of the furrow adjacent central longitudinal furrow axis 13a. In order to define a barrier that keeps seeds away from the central region 13 of the furrow, each guide member 20 is positioned closer to the central longitudinal furrow axis 13a than the seed delivery opening 14 such that the guide member blocks any seeds moving in the direct of the furrow central axis and directs them outwardly to the sidewalls 5 of the furrow 3.

Each guide member 20 is preferably removably mountable to the planting device 2. Guide member 20 is subject to wear as it mover through the soil, and will periodically require removal for maintenance or replacement. As best shown in FIG. 2, guide members 20 can be mounted to the rear edge 10 of the furrowing surface 8 by a bolt 24 inserted through a hole drilled through the rear edge. A protruding end of bolt 24 receives a nut and lock washer which serves to retain a bracket 26 to the rear edge. In the illustrated embodiment, a pair of spaced, guide members extend rearwardly from bracket 26. Other mounting scheme will be apparent to a person skilled in the art. For example, each guide member 20 may be independently mountable to the planting device and alternative fasteners may be used.

Guide member 20 is formed from a wear resistant, substantially rigid material capable of being drawn through the soil while maintaining its shape to define a wall surface which seeds contact to be deflected outwardly to the side walls of the furrow. Examples of suitable wear resistant materials include, but are not limited to, steel, rubber and plastic. In the case of plastic, ultra high molecular weight (UHMW) polyethylene is an appropriate construction material.

Guide member 20 is intended to act as a barrier to control movement of seeds within the furrow. In accordance with this function, it is possible to use guide member 20 in other positions and orientations to direct seeds to other pre-determined locations within the furrow. For example, in an application where a single seed row is desired above the fertilizer, guide member 20 can be positioned closer to the sidewall of the furrow that the seed delivery opening 14 to direct seeds inwardly toward the central longitudinal axis of the furrow.

Figure 3:
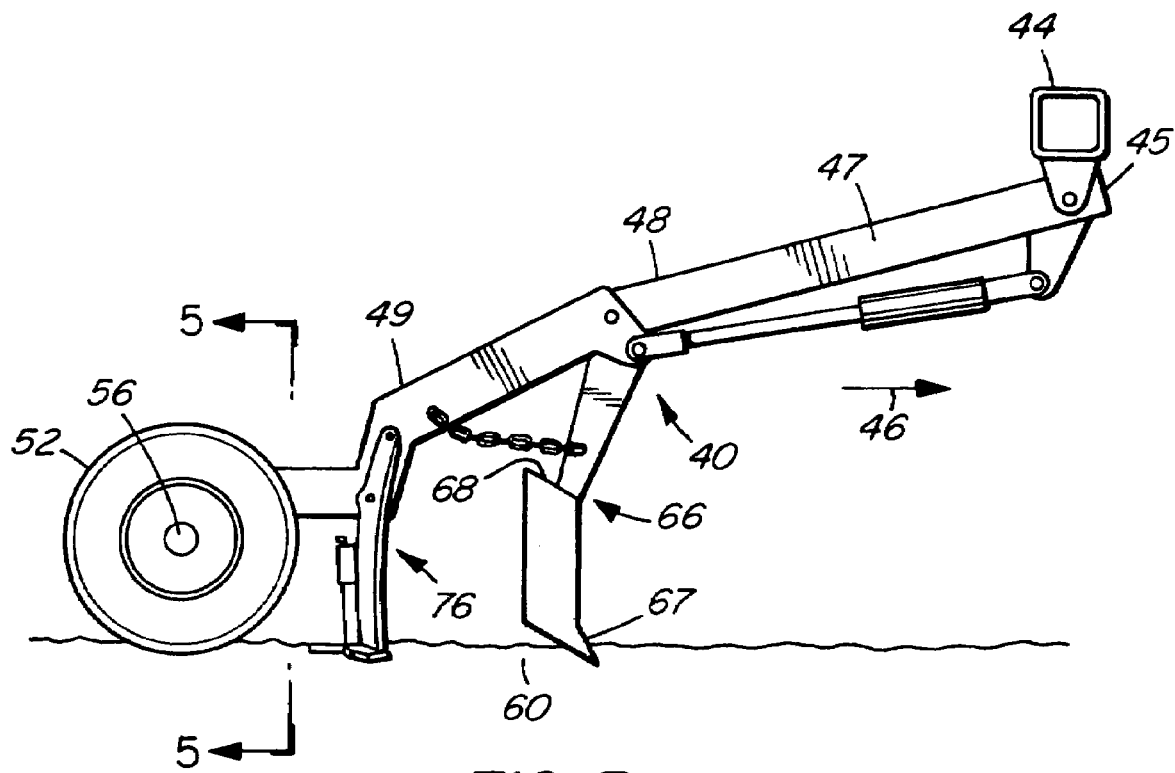
FIG. 3 is a side elevation view showing the apparatus of the present invention incorporated into a dual material planting apparatus.

Guide members 20 of the present invention find particular application in the dual material placement apparatus 40 that is the subject of commonly owned U.S. Pat. No. 6,955,131, which is incorporated herein by reference. FIG. 3 shows the dual material placement apparatus 40 in side elevation view for delivering fertilizer to a first depth in the ground and delivering a pair of seed rows to a second depth within a seed furrow above the fertilizer. In this arrangement, it is particularly important to keep the seed rows away from the centre of the seed furrow in order to keep the seeds spaced apart from the fertilizer.

The dual material placement apparatus of FIG. 3 is pivotally mounted to a conventional frame (not shown) by bracket 44 positioned at a first end 45 of an elongate main member 47. The frame acts to support first end 45 above the ground. The distal, second end 48 of the main member 47 is supported by an arm 49 pivotally mounted to the main member. Arm 49 supports a ground engaging or compressing member in the form of a wheel element 52 at the second end 51 of the arm. Wheel element 52 is rotatably mounted to arm 49 by an axle and bearings 56 to permit free rotation of the wheel element over the ground. The frame is towed across a field by a tractor or other suitable vehicle to pull the assembly 40 over the field in the direction indicated by arrow 46.

A first dispensing implement 66 for dispensing fertilizer to a first depth in the ground is mounted to main member 47. The first dispensing implement includes a knife 67 for forming a first fertilizer furrow 59 in the ground. As best shown in FIG. 4, which is a schematic plan view of the dual material placement apparatus, immediately behind knife 67, there is a tube 68 for depositing fertilizer 60 into the first furrow from a supply source (not shown). In FIG. 4, fertilizer 60 appears to be shown in an open furrow behind knife 67. In fact, fertilizer 60 is covered by soil collapsing back into furrow 59 behind knife 67, however, the fertilizer is shown uncovered to emphasize the placement of the row of fertilizer below the ground.

A second dispensing implement 76 for dispensing seeds to a second depth that is above the fertilizer is mounted to arm 49. Second dispensing implement 76 is essentially the seed delivery apparatus illustrated in FIGS. 1 to 2A equipped with guide members 20. The seed delivery apparatus creates a second furrow 80 as described above and deposits seeds 82 from a seed source into the second furrow. As best shown in FIG. 4, guide members 20 act to direct seeds of the seed row toward the outer edges 84 of the seed furrow on the sidewalls away from the fertilizer 60.

Immediately after delivery of the seeds into seed furrow 80, the soil tends to slip back into the furrow to cover the newly deposited seeds. In this regard, guide members 20 act to further retain the seeds in their desired positioned at the seed furrow sidewalls by preventing the seeds moving into the central region of the furrow with the soil flowing back.

Referring to FIGS. 3 and 5, after the seeds have been deposited into the soil, wheel element 52 rolls over the fertilizer and seed furrows in order to perform its packing function. As best shown in FIG. 5, which is a section view taken along line 5-5 of FIG. 3, seeds 80 are positioned in seed rows above and laterally displaced to either side of central fertilizer row 60, according to preferred agricultural practice.

Although the present invention has been described in some detail by way of example for purposes of clarity and understanding, it will be apparent that certain changes and modifications may be practised within the scope of the appended claims.

We claim:

1. In a planting device for delivering fertilizer to a first depth in the ground and delivering at least one seed row to a second depth within a seed furrow above the fertilizer, the planting device including a seed delivery portion having a furrowing surface for creating the seed furrow, and at least one seed delivery opening for introducing seeds into the seed furrow at said at least one seed row, the improvement comprising:

at least one guide member associated with each at least one seed row for re-directing seeds which rebound off a wall of the seed furrow back toward the wall of the seed furrow and away from the fertilizer, said at least one guide member extending from the seed delivery portion adjacent and external to the at least one seed delivery opening.

2. The planting device of claim 1 including a fertilizer delivery portion having a furrowing surface for creating a fertilizer furrow at the first depth into which the fertilizer is delivered.

3. The planting device of claim 1 in which the seed delivery portion includes two seed delivery openings and two guide members extending generally parallel to the walls of the seed furrow adjacent a central axis of the furrow.

4. The planting device of claim 1 in which the at least one guide member is removably mounted to the planting device.

5. The planting device of claim 1 in which the at least one guide member is formed from a wear resistant material.

6. The planting device of claim 5 in which the wear resistant material is selected from the group consisting of steel, rubber and plastic.

7. In a planting device for delivering at least one seed row into a furrow having a furrow bottom and furrow side walls, the planting device including a seed delivery portion having a furrowing surface for creating the furrow, and at least one seed delivery opening for introducing seeds into the furrow to form said at least one seed row, the improvement comprising:

at least one guide member associated with each at least one seed row for re-directing seeds which rebound off the furrow side walls toward a central axis of the furrow back toward the furrow side walls, said at least one guide member extending from the seed delivery portion adjacent the at least one seed delivery opening.

8. The planting device of claim 7 in which the seed delivery portion includes two seed delivery openings and two guide members extending generally parallel to the walls of the furrow adjacent the central axis of the furrow.

9. The planting device of claim 7 in which the at least one guide member is removably mounted to the planting device.

10. The planting device of claim 7 in which the at least one guide member is formed from a wear resistant material.

11. The planting device of claim 10 in which the wear resistant material is selected from the group consisting of steel, rubber and plastic.

12. Apparatus for controlling the placement of seeds deposited by a seed placement device in a furrow, comprising:

a guide member connected to the seed placement device adjacent an exit of the seeds from the placement device adapted to urge seeds discharged from the exit which rebound off a side wall of the furrow toward a center of the furrow back toward the side wall of the furrow.

13. The apparatus of claim 12 in which the guide member comprises a generally rectangular wall portion extending outwardly from the seed placement device in a direction generally parallel to the sidewalls of the furrow.

14. The apparatus of claim 12 in which the guide member is removably mounted to the seed placement device.

15. The apparatus of claim 12 in which the guide member is formed from a wear resistant material.

16. The apparatus of claim 15 in which the wear resistant material is selected from the group consisting of steel, rubber and plastic.

* * * * *